(No Model.)
F. P. BONNEAU.
ART OF FORMING BEARINGS FOR WATCHES.
No. 372,113. Patented Oct. 25, 1887.
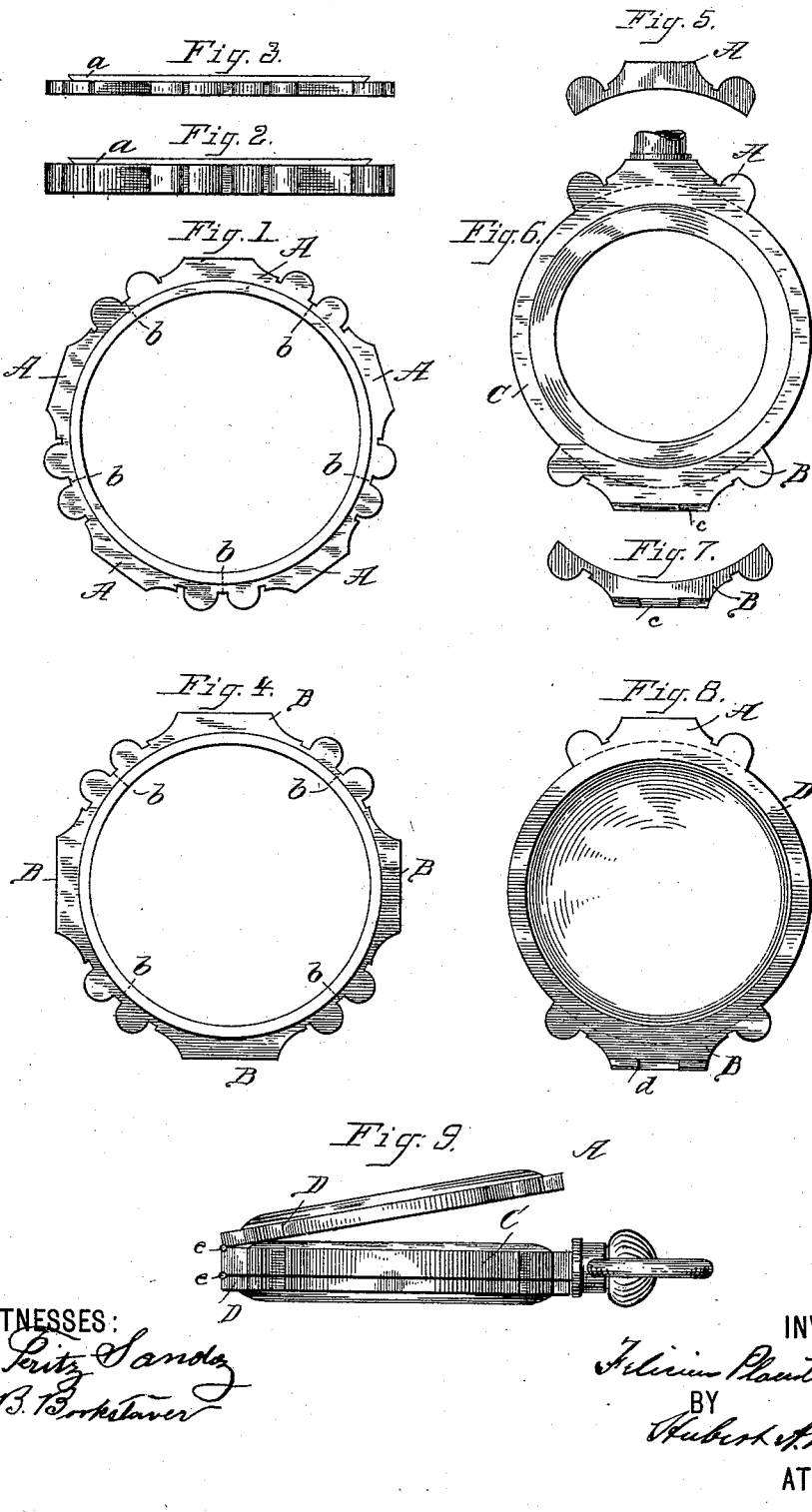
WITNESSES:
INVENTOR
BY
ATTORNEY

UNITED STATES PATENT OFFICE.

FÉLICIEN PLACIDE BONNEAU, OF NEW YORK, N. Y., ASSIGNOR OF ONE-FOURTH TO JULES FRITZ SANDOZ, OF SAME PLACE.

ART OF FORMING BEARINGS FOR WATCHES.

SPECIFICATION forming part of Letters Patent No. 372,113, dated October 25, 1887.

Application filed January 20, 1887. Serial No. 224,832. (No model.)

*To all whom it may concern:*

Be it known that I, FÉLICIEN PLACIDE BONNEAU, a citizen of France, and a resident of the city of New York, in the county and State of New York, have invented certain new and useful Improvements in Ornamental Center and Bezel Rim Bearings for Box-Cases for Watches, of which the following is such a full, clear, concise, and exact description as will enable others skilled in the art to which my invention appertains to make and use the same, reference being had to the accompanying drawings, forming part of this specification.

My invention has for its object the construction of an ornamental bearing which, being secured to the center rim or bezel of a box case for a watch, adapts the same to receive or make connections with such other parts as are necessary in order to form the hinges, secure the stem, or close the backs; and to this end the invention consists in molding the ornamental parts intended for bearings, afterward finishing the same, and soldering or otherwise securing them upon the center rim or the bezel, as the case may be, at such points as it may be desired to have them.

In the drawings, Figures 1 and 4 are top views of such ornamental bearings molded in a ring or circle, Fig. 1 showing a ring composed of five such bearings, and Fig. 4 a ring of the same size which is composed of four bearings. Figs. 2 and 3 are edge views of such rings, showing different thicknesses of the metal, the thicker one being intended to form the bearings of a center rim and the thinner one for the bearings of a bezel-rim. Fig. 5 represents a bearing cut from the ring shown by Fig. 1 finished and ready to be soldered upon the center rim or bezel at the upper end or that which receives the stem, while Fig. 7 represents a bearing cut from the ring shown by Fig. 4, which is finished so as to receive the hinge-connections, such bearing being intended for the center rim at the bottom or lower portion of the watch; and Fig. 6 is a top view of a center rim after the bearings are secured thereto by being soldered thereon at the points indicated by the dotted lines. This figure also shows a portion of the stem. Fig. 8 is an inside view of one of the backs for a watch, upon the bezel-rim of which similar bearings are soldered or secured at the points indicated by the dotted lines. Fig. 9 is an edge view of a watch-case when finished, showing one of the backs partly open, and in the construction of which these ornamental bearings are employed both upon the center and bezel rims.

In the drawings, A represents a bearing of the smallest size which it is desired to use, the same being taken from the ring composed of the largest number of such bearings; and B, one of a larger size. The smaller bearing is usually at the top of the watch-case, while the larger one is at the bottom and receives the hinge-connection. C represents a center rim such as is usually employed in forming box-cases, and D the bezel-rim of one of the backs.

In practice I mold several bearings with their ornamental designs in one ring, and in order that the same may be turned for the purpose of finishing the inside perfectly I prefer to have a flange, $a$, project from one side of the same, thus forming a convenient means of chucking the ring to secure it while the turning or grinding takes place. A ring composed of such bearings is formed by molding the metal in suitable designs and with an inner periphery corresponding in width to that of the portion of the outer periphery of center rim or bezel over which it is made to fit and be secured, and after being finished the bearings are severed from one another, as indicated at the points $b$, and they are afterward soldered or secured upon the center rim or bezel-rim. Those which are intended to form the hinge by which the back is secured to the center rim are properly shaped to receive connection with each other, as indicated at $c$ and $d$, which are corresponding parts of the hinge formed upon the bearings for the center and bezel rims, respectively, so that such hinge is completed by the insertion of a pin, $e$, which appears in Fig. 9.

In order to make bearings of different lengths fit upon the same center rim or bezel bearing-rims of the same diameter, but composed of a different number of bearings, are molded, and thus a center rim or bezel having its radius from the periphery equal to the radius from the inside of the ring composed of the bearings will receive the same, so that a perfect fit is secured, and the bearings may best be adapted for receiving their connections with the watch-case or watch-stem before they are soldered or secured upon the rim or bezel.

By molding and finishing the bearings separately from the center rim or bezels, I am enabled to perform the work more expeditiously than when the ornaments are turned from a solid piece, and this also allows of the making and finishing of the center and bezel rims so that they are finished for use with the exception of the bearings, and in thus making them ready for the reception of such bearings the trouble occasioned by making and finishing the whole in one piece is obviated. Moreover, it will be obvious that any number of bearings may be prepared ready to be soldered upon the center rims or bezels at one time.

Having thus described my invention, what I claim as new, and desire to secure by Letters Patent, is—

1. The improvement in the art of forming center-rim, &c., bearings for watch-cases, which consists in molding metal in the form of a ring composed of several bearings, finishing the same, and severing the ring so formed and finished into as many parts as there are bearings composing it, substantially as and for the purpose set forth.

2. The improvement in the art of forming different-sized bearings or ornamental projections for a watch-case center, &c., rim, which consists in molding metal rings of the same diameter, but composed of bearings of different sizes, finishing such rings, severing the same into as many parts as there are bearings composing them, then uniting the different-sized bearings to a center rim of the same diameter as the molded bearing-rings, substantially as and for the purpose set forth.

FÉLICIEN PLACIDE BONNEAU.

Witnesses:
JULES FRITZ SANDOZ,
HUBERT A. BANNING.